Patented May 23, 1933

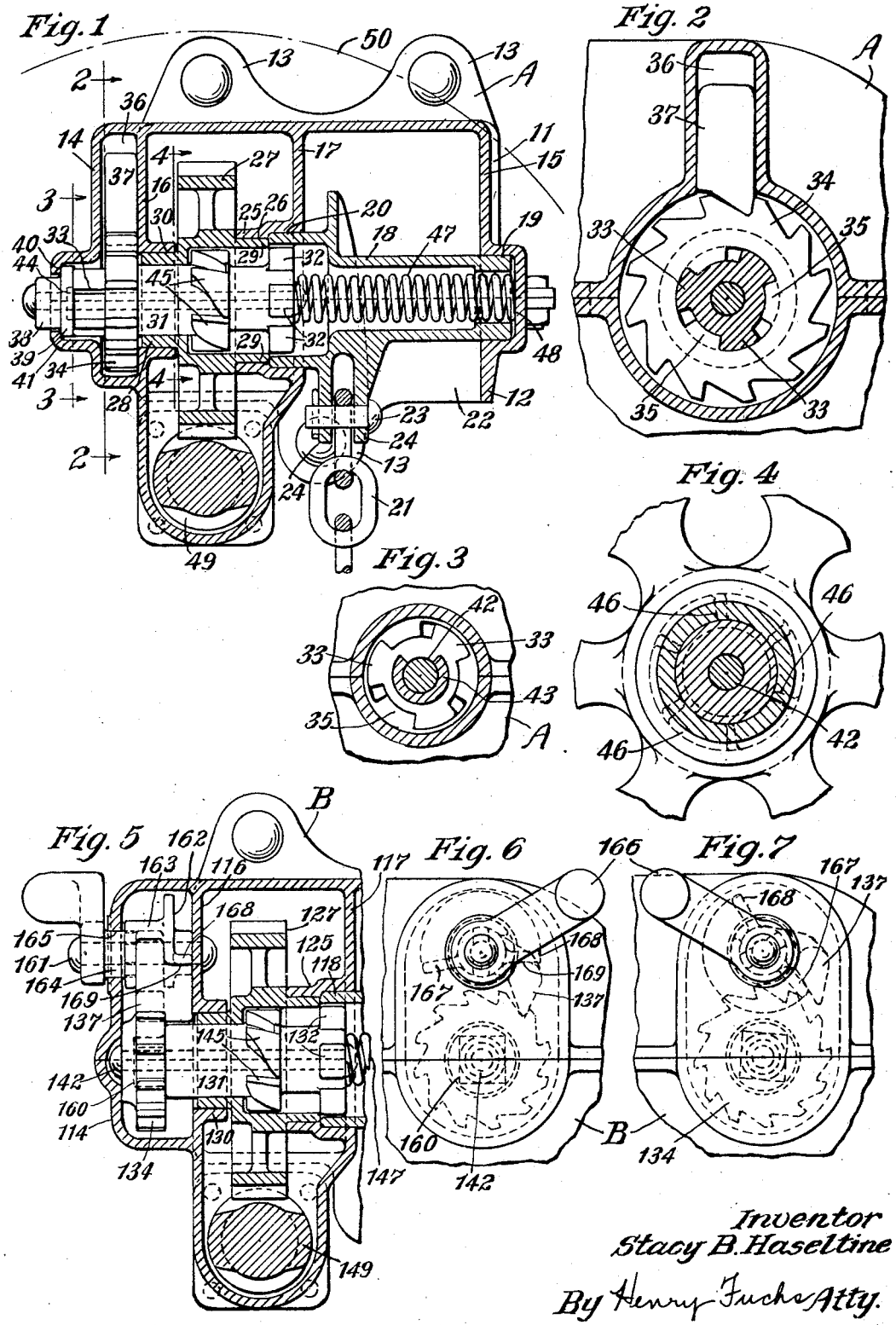

1,909,952

UNITED STATES PATENT OFFICE

STACY B. HASELTINE, OF CHICAGO, ILLINOIS, ASSIGNOR TO W. H. MINER, INC., OF CHICAGO, ILLINOIS, A CORPORATION OF DELAWARE

HAND BRAKE

Application filed February 5, 1932. Serial No. 591,078.

This invention relates to improvements in hand brakes.

One object of the invention is to provide a hand brake mechanism for railway cars, of simple and efficient design, including an operating hand wheel, wherein the hand wheel serves both as means for actuating the winding mechanism of the brakes in chain-tightening direction and as means for quickly releasing the brakes by disconnecting the chain-winding means from the hand wheel, thereby also preventing backward rotation of the hand wheel in release and protecting the brakeman from injury.

Another object of the invention is to provide a brake mechanism of the character indicated in the preceding paragraph, wherein quick release of the brake mechanism is obtained by rotation of the hand wheel in a direction reverse to the direction of rotation thereof while tightening the chain, and wherein the hand wheel is also employed to back off the brakes within certain limits.

A more specific object of the invention is to provide a hand wheel actuated brake mechanism including a chain-winding drum and power-multiplying actuating gearing therefor, comprising an intermeshing worm and worm wheel adapted to hold the brake mechanism against rotation in chain-unwinding direction by the friction between said worm and worm wheel, wherein quick release is had by free rotation of the drum which is entirely disconnected from the worm gearing through the operation of means actuated by the hand wheel in chain-unwinding direction.

A further object of the invention is to provide in a mechanism of the character specified in the preceding paragraph releasable clutch means for operatively connecting the drum and power-multiplying gearing, wherein the clutch is released by clutch shifting cam means actuated by rotation of the gear means in chain-unwinding direction with respect to the clutch, which clutch means at such time is held against rotation by a locking dog and wherein the dog may be unlocked from the clutch means to prevent shifting and disengagement thereof so that backing off of the brakes may be effected by rotation of the winding drum controlled by the hand wheel.

Other objects of the invention will more clearly appear from the description and claims hereinafter following.

In the drawing, forming a part of this specification, Figure 1 is a vertical sectional view through a hand brake mechanism applied to the end wall of a railway car, illustrating my improvements in connection therewith, the section being in a plane parallel to said end wall. Figures 2, 3, and 4 are partly broken away, vertical sectional views respectively corresponding to the lines 2—2, 3—3, and 4—4 of Figure 1. Figure 5 is a partly broken view similar to Figure 1, illustrating another embodiment of the invention. And Figures 6 and 7 are partly broken, elevational views looking from the left in Figure 5, parts of the mechanism being shown in dotted lines, Figure 6 showing the parts in substantially the position illustrated in Figure 5, and Figure 7 showing the parts in different relative positions.

In said drawing, referring first to the embodiment of the invention illustrated in Figures 1 to 4 inclusive, the brake mechanism proper is contained within a two-part housing A, as most clearly illustrated in Figures 1 and 2. The housing A is preferably mounted on the end wall of the car in the position shown in Figure 1 and comprises top and bottom sections 11 and 12 divided along a central horizontal plane. The sections 11 and 12 of the housing are provided with securing lugs or ears 13—13 by which the housing is fixed to the end wall of the car. The housing has vertical end walls 14 and 15, which are in planes at right angles to the end wall of the car, and the interior of the housing is divided into compartments by vertically disposed partition walls 16 and 17, which are substantially parallel to the end walls 14 and 15. The housing A contains the chain-winding drum 18, which has its opposite ends rotatably supported in bearing openings 19 and 20 provided respectively in the walls 15 and 17. The chain-winding drum 18 has the usual brake chain 21 connected thereto, the housing A being provided with a bottom opening 22 to accommodate the chain. The chain 21 has the end link thereof fixed to the drum by means of a pin or rivet 23 extending through spaced securing lugs 24—24 projecting from the winding section of the drum. The drum is of hollow construction, as clearly shown in Figure 1, and has the bearing portion thereof, which is mounted in the bearing opening 20, of larger diameter than the bearing portion mounted in the bearing opening 19. At the left-hand side, as viewed in Figure 1, the bearing opening 20 is provided with an annular reinforcing wall 25, which projects beyond the bearing portion of the winding drum and provides a cylindrical bearing member 26 for a purpose hereinafter pointed out.

A worm wheel 27 is mounted between the walls 16 and 17 of the housing and has cylindrical hub sections 28 and 29 projecting from opposite sides thereof, the hub section 29 being journaled in the bearing member 26 and the hub section 28 being journaled in a bearing member 30 projecting inwardly from the wall 16. A sliding clutch member 31 is mounted within the gear 27, the clutch member having clutch projections 32—32 at the inner end thereof cooperating with a plurality of clutch projections on the interior of the corresponding end of the chain-winding drum. At the outer end, the clutch member 31 projects beyond the corresponding hub portion of the worm wheel 27, said projecting section of the clutch being provided with three radially extending lugs 33—33—33 for a purpose hereinafter pointed out. The outer surfaces of the lugs 33 and the sections of the clutch member between these lugs are preferably of cylindrical formation so as to provide bearing means for a ratchet member 34, which is mounted thereon for limited rotation with respect thereto. The central opening of the ratchet member 34 is provided with radially projecting interior lugs 35—35—35, which are alternated with the lugs 33—33—33 of the clutch member and normally spaced therefrom, as shown in Figure 2, thus providing a lost motion connection between the clutch 31 and the ratchet member 34. As clearly shown in Figure 2, the portion of the housing between the walls 14 and 16 is so formed as to provide a vertical guideway 36, within which a gravity-influenced locking dog 37 is slidable. The locking dog 37 cooperates with the teeth of the ratchet member 34 to hold the latter against rotation in a direction corresponding to the unwinding movement of the chain drum.

The clutch member 31 projects outwardly beyond the ratchet member 34 to such an extent that the engaging lugs 33 of the clutch member 31 will at all times cooperate with the lugs 35 of the ratchet member 34. A cap 38 is seated on the outer end of the clutch member, said cap having an annular flange 39 at the inner end engaging an annular shoulder 40 provided by a bearing boss member 41 projecting outwardly from the end wall 14 of the housing. The cap 38 is secured to the clutch member 31 by means of a rivet 42 extending through these parts. In order to hold the cap 38 against relative rotation with respect to the clutch 31, the latter is provided with an arcuate flange 43 at the extremity thereof seated in a corresponding recess 44 provided at the inner end of the cap. Between the ends thereof, the clutch member 31 is provided with a plurality of cam projections 45—45 which cooperate with complementary cam projections 46—46 on the interior of the hub section of the worm wheel 27. The cooperating cam faces of the projections 45 and 46 are so inclined that when the worm wheel is rotated with respect to the clutch member in a chain-unwinding direction, while the clutch member is held stationary, the latter will be slid to the right, as viewed in Figure 1, thereby disengaging the clutch projections 32 from the interior clutch projections of the chain-winding drum 18. The flange 39 of the cap 38 of the clutch 31 is so spaced from the ratchet wheel 34 that inward movement of the clutch will be limited by engagement of the flange 39 with said ratchet wheel so that the cam projections 45 will always overlap the cam projections 46. The clutch 31 is yieldingly held in clutching engagement with the chain-winding drum by means of a spring 47 within the hollow portion of the drum and interposed between the inner end of the clutch 31 and an end wall 48 of the bearing member 19.

The worm wheel 27 is actuated by a worm member 49 disposed below the worm wheel and having its opposite ends journaled in the housing A. The worm member 49 is actuated by the usual hand wheel, which is indicated by dotted lines 50 in Figure 1.

The operation of my improved hand brake mechanism as shown in Figures 1 to 4 inclusive is as follows: To tighten the chain, the worm wheel 27 is rotated in a clockwise direction by means of the worm 49, as viewed in Figure 2, thereby rotating the clutch 31 in the same direction and, through the engagement of the clutch with the drum 18, actuating the latter to wind the chain thereon. During the winding operation, the ratchet member 34 will be rotated in unison with the clutch 31 through the interengaging clutch projections 33 and 35. At this time the dog 37 ratchets over the teeth of the member 34, but prevents backward rotation of this member. In effecting release of the brakes, the worm 49 is rotated in a reverse direction to that hereinbefore described, thereby rotating the worm wheel in a contraclockwise direction, as viewed in Figures 2 and 4. Inasmuch as the clutch 31 is at this time in clutching engagement with the drum 18, the latter will be rotated in contraclockwise direction also, thereby unwinding the chain 21. This unwinding action of the chain takes place during a part revolution only of the worm wheel 27. After a predetermined rotation of the worm wheel 27 and clutch 31 in unwinding direction, the lugs 33 of the clutch will engage the lugs 35 of the ratchet member 34, thereby holding the clutch 31 against rotation in said unwinding direction. Due to the clutch being held against rotation, further rotation of the worm wheel 27 will be effected with respect to said clutch, thereby camming the clutch inwardly or toward the right, as viewed in Figure 1, and disengaging the projections 32 from the cooperating projections of the chain-winding drum, thereby freeing the drum for rotation with respect to the other mechanism and permitting unwinding of the chain without rotation of the hand wheel and other parts of the driving means. As will be evident, the lost motion between the lugs of the clutch and the lugs of the ratchet member provide for limited backing off of the brakes before complete release is effected. Inasmuch as the cap 38 of the shiftable clutch member extends through the end wall of the housing, it serves to give visual evidence as to the position and action of the clutch so that the operator may readily determine to what extent the brakes may be safely backed off without releasing the clutch. In this connection, it is pointed out that the brake drum is at all times locked against unwinding movement by the friction between the worm and the worm wheel of the brake mechanism, unless the clutch 31 is disengaged from the chain-winding drum, the locking dog 37 being provided merely for holding the ratchet member 34 against backward rotation so that the clutch 31 will be arrested at the proper time to ensure shifting of the same by means of the camming action produced by the worm wheel 27.

Referring next to the embodiment of the invention illustrated in Figures 5, 6, and 7, the general construction of the brake mechanism is substantially the same as that described in connection with Figures 1, 2, 3, and 4, with the exception that the clutch element has the ratchet member fixed thereto, instead of having a lost motion connection therewith, and that the dog which cooperates with the ratchet member is releasable therefrom so as to provide for backing off of the brakes.

The operating mechanism is contained within a housing B, which is of substantially the same design as the housing A hereinbefore described, said housing B having walls 114, 116, and 117, corresponding substantially to the walls 14, 16, and 17 hereinbefore described. The wall 117 is provided with a bearing member 125, within which the bearing portion at the inner end of the drum 118 is rotatably supported. The bearing member 125 also serves as a bearing means for the hub section on the inner side of the worm wheel 127, which corresponds to the worm wheel 27 of Figures 1 to 4 inclusive. The wall 116 of the housing B has a bearing member 130 formed thereon, which rotatably receives the outer hub section of the worm wheel 127. The sliding clutch member, which is indicated by 131, is similar to the clutch member 31 hereinbefore described, having lugs 132—132 at the inner end thereof, which cooperate with interior lugs of the drum 118. Midway between the ends, the clutch member 131 carries cam projections 145—145, similar to the projections 45 hereinbefore described, which cooperate with interior cam projections on the worm wheel 127. The worm wheel 127 is driven by a worm member 149 disposed below the same. At the outer end, the clutch member 131 is reduced in thickness, said reduced portion being of substantially square cross section, as indicated at 160, and fitting within an opening of similar formation in the ratchet member 134. The ratchet member 134 is fixed to the clutch member 131 by means of a rivet 142 extending through these members. The ratchet member 134 has a releasable locking dog 137 cooperating therewith, the dog being pivotally mounted on a rivetlike pin 161 extending through the upper end of the dog and through the walls 114 and 116 of the housing.

An operating member 162 is rotatably supported on the pin 161 and has a section 163 thereof overhanging the upper end portion of the dog 137. An operating lever 166 is employed for oscillating the member 162. The lever 166 is provided with a journal portion 164 rotatably supported in a bearing opening 165 of the wall 114 and connected to the member 162 by any well-known means, such as locking lugs on the journal portion 164 engaging in recesses in the member 162. The section 163 of the member 162 is of sector shape and has a pair of radial flanges 167 and 168 thereon. The flange 168 is adapted to bear on a transverse abutment face 169 of the dog 137, as clearly shown in Figure 6, so as to hold the dog yieldingly engaged with the ratchet member 134. The flange 167 of the member 162 is adapted to engage the under side of the dog 137 when the member 162 is rotated to the position shown in Figure 7, thereby lifting the dog out of engagement with the ratchet member and holding the same in that position. As will be clear upon reference to Figure 5, the engaging toothed edge of the dog 137 is of greater width than the ratchet portion of the member 134 so that the teeth of the ratchet member will at all times be engaged by the dog when said ratchet member is shifted with the clutch 131. The clutch is normally held engaged with the chain-winding drum by means of a spring 147, similar to the spring 47 hereinbefore described.

The operation of my improved hand brake mechanism as shown in Figures 5, 6, and 7 is as follows: In tightening the brakes, the chain is wound on the drum 118 by rotation of the worm 149 and the intermeshing worm wheel 127, motion being communicated from the worm wheel 127 to the drum 118 by the clutch 131. To back off the brakes, the worm wheel 127 is rotated in a reverse direction, thereby rotating the clutch 131 and the drum 118 in chain-unwinding direction. In order to permit this unwinding action, the dog 137 is disengaged from the ratchet member 134, as shown in Figure 7, thus permitting rotation of the clutch 131 in unison with the ratchet wheel 127. In order to effect quick release of the brakes, the locking dog 137 is engaged with the ratchet member 142, as shown in Figure 6, thus holding the clutch member 131 against rotation in chain-unwinding direction. The gear 127 is then rotated in chain-unwinding direction through the worm member 149, thereby providing relative rotation between the worm wheel and the clutch 131 to cam the clutch inwardly or to the right, as viewed in Figure 5, through coaction of the cam projections on the worm wheel 127 and the clutch member. The clutch will thus be shifted to disengage the projections 132 thereof from the cooperating clutch projections of the winding drum 118, thus freeing the drum and allowing rotation thereof with respect to the driving gearing of the brakes.

From the preceding description taken in connection with the drawing, it will be clear that I have provided an exceedingly simple and efficient brake mechanism wherein all of the operations thereof are effected through manipulation of the hand wheel, winding of the brakes being produced by rotation of the hand wheel in one direction and backing off and quick release of the brakes being effected by rotation of the hand wheel in a reverse direction.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a rotary chain-winding drum; of a worm gear coaxial with said drum; a releasable clutch member slidable coaxially of said gear and drum and normally operatively connecting the same for rotation in unison; a worm member for driving said worm gear; cooperating cam means on said worm gear and clutch member for shifting said clutch member axially to release the same when said worm gear is rotated in chain-unwinding direction with respect to the clutch member; and means for holding said clutch member against rotation in chain-unwinding direction.

2. In a hand brake mechanism, the combination with a rotary chain-winding drum; of a worm gear coaxial with said drum; a releasable clutch member slidable coaxially of said gear and drum and normally operatively connecting the same for rotation in unison; a worm member for driving said worm gear; cooperating cam means on said worm gear and clutch member for shifting said clutch member axially to release the same when said worm gear is rotated in chain-unwinding direction with respect to the clutch member; a ratchet member rotatable with said clutch member; and a locking dog cooperating with said ratchet member for holding said ratchet member and clutch member against rotation in chain-unwinding direction.

3. In a hand brake mechanism, the combination with a chain-winding drum; of worm gearing for rotating said drum; a rotary operating member for actuating said worm gearing; releasable clutch means for operatively connecting said worm gearing and drum; means for holding said clutch means against rotation in chain-unwinding direction; and means for delaying the releasing action of said clutch means to permit backing off of the drum through rotation of said gearing in chain-unwinding direction.

4. In a hand brake mechanism, the combination with a chain-winding drum; of worm gearing for rotating the drum; a rotary operating member for actuating said worm gearing; releasable clutch means for operatively connecting said worm gearing and drum; a lost motion ratchet means for holding said clutch means against rotation in chain-unwinding direction after a predetermined rotation of said clutch means in chain-unwinding direction; and means actuated through rotation of said worm gearing in chain-unwinding direction with respect to said clutch means for shifting said clutch means to release the same after a predetermined backing off of the brakes.

5. In a hand brake mechanism, the combination with a rotary chain-winding drum; of a worm gear coaxial with said drum; a releasable clutch member slidable coaxially of said gear and drum and normally operatively connecting the same for rotation in unison; a worm member for driving said worm gear; cooperating cam means on said worm gear and clutch member for shifting said clutch member axially to release the same when said worm gear is rotated in chain-unwinding direction with respect to the clutch member; and means operative after a predetermined rotation of said clutch member in chain-unwinding direction for holding said clutch member against rotation in said last named direction.

6. In a hand brake mechinsm, the combination with a rotary chain-winding drum; of a worm gear coaxial with said drum; a releasable clutch member slidable coaxially of said gear and drum and normally operatively connecting the same for rotation in unison; a worm member for driving said worm gear; cooperating cam means on said worm gear and clutch member for shifting said clutch member axially to release the same when said worm gear is rotated in chain-unwinding direction with respect to the clutch member; a ratchet member having a lost motion connection with said clutch member; and a locking dog cooperating with said ratchet member for holding said ratchet member against rotation in chain-unwinding direction.

7. In a hand brake mechanism, the combination with a chain-winding drum; of worm gearing for rotating said drum; releasable clutch means for operatively connecting said worm gearing and drum; releasable means for holding said clutch means against rotation in chain-unwinding direction, said clutch means when released permitting backing off of the brakes by rotation of said gearing in chain-unwinding direction; and means actuated through rotation of said worm gearing in chain-unwinding direction with respect to said clutch means when the latter is held against rotation for releasing said clutch means.

8. In a hand brake mechanism, the combination with a chain-winding drum; of worm gearing for rotating said drum; releasable clutch means for operatively connecting said worm gearing and drum; releasable means for holding said clutch means against rotation in chain-unwinding direction, said clutch means when released permitting backing off of the brakes by rotation of said gearing in chain-unwinding direction; and rotary cam means actuated through relative rotation of said worm gearing and clutch means in chain-unwinding direction for releasing said clutch means.

9. In a hand brake mechanism, the combination with a chain-winding drum; of worm gearing for rotating the drum; a rotary operating member for actuating said worm gearing; releasable clutch means for operatively connecting said worm gearing and drum; releasable ratchet means for holding said clutch means against rotation in chain-unwinding direction; and means actuated through rotation of said worm gearing in chain-unwinding direction with respect to said clutch means for shifting said clutch means to release the same.

10. In a hand brake mechanism, the combination with a rotary chain-winding drum; of a worm gear coaxial with said drum; a releasable clutch member slidable coaxially of said gear and drum and normally operatively connecting the same for rotation in unison; a worm member for driving said worm gear; cooperating cam means on said worm gear and clutch member for shifting said clutch member axially to release the same when said worm gear is rotated in chain-unwinding direction with respect to the clutch member; and a releasable locking dog for holding said clutch member against rotation in chain-unwinding direction, said dog when released permitting rotation of said clutch member in unison with said worm gear in chain-unwinding direction to effect backing off of the brake mechanism.

11. In a hand brake mechanism, the combination with a rotary chain-winding drum; of a worm gear coaxial with said drum; a releasable clutch member slidable coaxially of said gear and drum and normally operatively connecting the same for rotation in unison; a worm member for driving said worm gear; cooperating cam means on said worm gear and clutch member for shifting said clutch member axially to release the same when said worm gear is rotated in chain-unwinding direction with respect to the clutch member; a ratchet member fixed to said clutch member; and a releasable locking dog engageable with said ratchet member for holding the same and the clutch member against rotation in chain-unwinding direction.

12. In a hand brake mechanism, the combination with a housing; of a chain-winding drum; worm gearing for rotating the drum; releasable clutch means for operatively connecting said worm gearing and drum; ratchet means for holding said clutch means against rotation in chain-unwinding direction; means actuated through rotation of said worm gearing in chain-unwinding direction with respect to said clutch means for shifting said clutch means to release the same, said drum, gearing, clutch means, ratchet means, and clutch shifting means being enclosed by said housing, and said clutch means having a portion thereof extending through the housing to give visual evidence of the operation of said clutch means; and a rotary operating member for actuating said worm gearing.

In witness that I claim the foregoing I have hereunto subscribed my name this 3rd day of February, 1932.

STACY B. HASELTINE.